United States Patent [19]

Harper et al.

[11] 4,062,052

[45] * Dec. 6, 1977

[54] CIRCUIT BREAKER WITH IMPROVED DELAY

[75] Inventors: George S. Harper; Lyal N. Merriken, both of Cambridge, Md.

[73] Assignee: Airpax Electronics, Inc., Cambridge, Md.

[ * ] Notice: The portion of the term of this patent subsequent to May 25, 1993, has been disclaimed.

[21] Appl. No.: 684,232

[22] Filed: May 7, 1976

Related U.S. Application Data

[63] Continuation-in-part of Ser. No. 532,645, Dec. 13, 1974, Pat. No. 3,959,755.

[51] Int. Cl.[2] .......................... H02H 7/08; H01H 7/00

[52] U.S. Cl. .......................................... 361/28; 335/59; 335/63

[58] Field of Search .................... 335/63, 59, 240, 236, 335/241; 337/6; 317/40 A; 361/23, 28

[56] References Cited

U.S. PATENT DOCUMENTS

| | | | |
|---|---|---|---|
| 3,517,357 | 6/1970 | Bakes | 335/241 |
| 3,638,157 | 1/1972 | Kruzic | 337/6 |
| 3,689,855 | 9/1972 | Setone et al. | 335/63 |
| 3,777,294 | 12/1973 | Grenier | 335/236 |
| 3,959,755 | 5/1976 | Harper et al. | 335/63 |
| 3,987,340 | 10/1976 | Kussy | 317/40 A |

*Primary Examiner*—Harold Broome
*Attorney, Agent, or Firm*—LeBlanc & Shur

[57] ABSTRACT

Disclosed is a magnetic circuit breaker having improved delay characteristics and particularly improved pulse tolerance. The trip coil of the breaker is spaced from the magnetic pole piece of a delay tube by a non-conductive, non-magnetic gap and the delay core is elongated. An inertia wheel is mechanically coupled to the trip armature to further increase pulse tolerance so as to reduce nuisance tripping in the presence of high but very short term overcurrents. The circuit breaker provides a significantly improved motor protection characteristic.

17 Claims, 7 Drawing Figures

FIG. 1
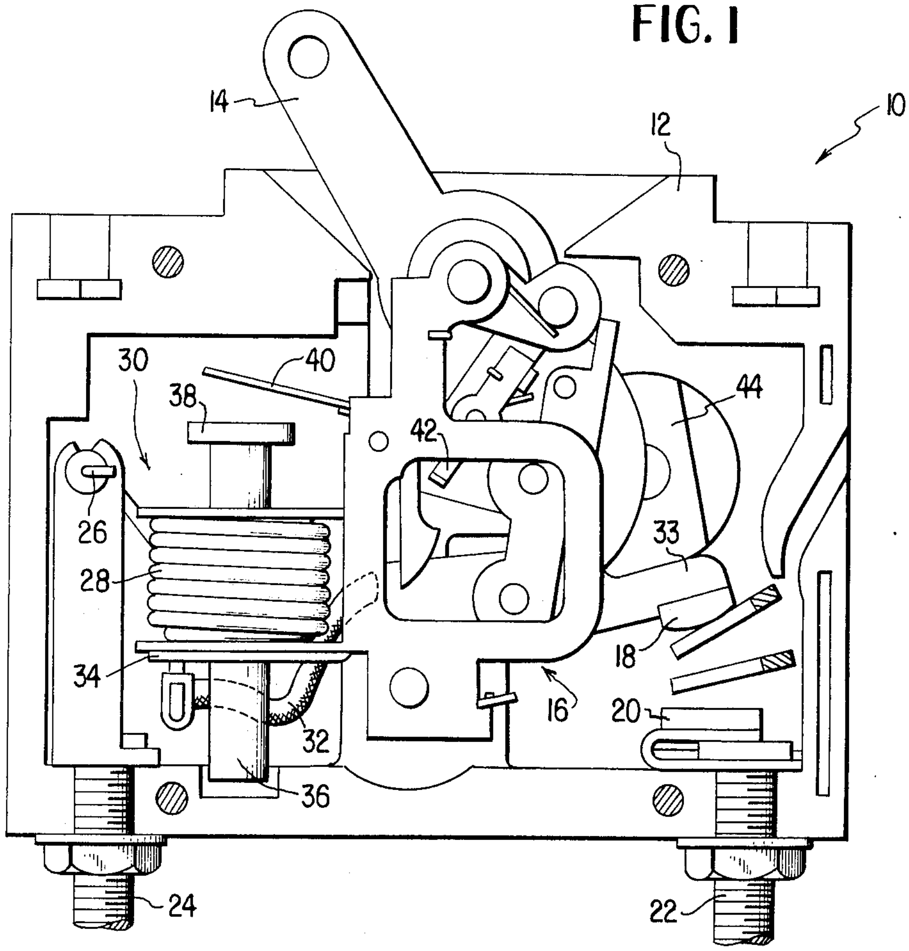
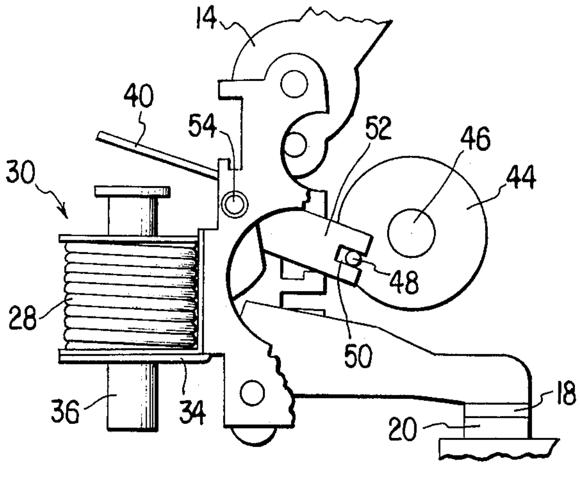
FIG. 2
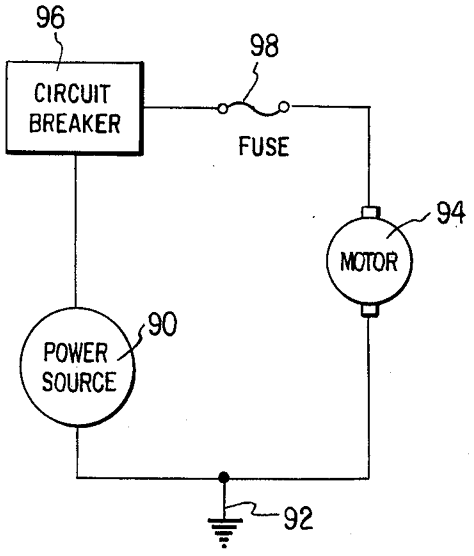
FIG. 6

CIRCUIT BREAKER WITH IMPROVED DELAY

This application is a continuation-in-part of application Ser. No. 532,645, filed Dec. 13, 1974, now U.S. Pat. No. 3,959,755.

This invention relates to a circuit breaker with improved tolerance to high current surges of both short and long duration and more particularly is directed to an electro-magnetic circuit breaker with improved pulse tolerance to minimize nuisance tripping.

Electro-magnetic circuit breakers are conventionally provided with an over current coil in series with the electrical equipment to be protected. The coil is positioned adjacent an armature and when excess current flows through the coil, the armature is attracted to the coil, tripping a spring biased toggle mechanism to open the circuit. However, electro-magnetic circuit breakers do not exhibit the thermal inertia of a bimetallic thermal breaker and as a result are susceptible to so-called nuisance tripping. This is, the electro-magnetic circuit breaker can be tripped by short duration, high current surges such as during motor start-up or the like where no damage results from the current surge and therefore tripping of the circuit breaker is not desired.

For example, starting up of motors, particularly single phase, AC induction types, may result in high current surges. Motor starting in-rush pulses are usually less than six times the steady state motor current and may typically last about one second. Nuisance tripping under these conditions can be avoided by providing a so-called delay tube within the coil. This tube conventionally encloses a slug of magnetic material which is spring-biased away from the electro-magnet pole piece. By incorporating in the delay tube a fluid of suitable viscosity, such as oil or the like, tripping can be delayed for in-rush currents of this magnitude sufficiently so that the surge of current disappears before the circuit breaker is tripped. However, for motor starting overcurrents of higher magnitude such as about 6 to 10 times rated current conventional circuit breaker delay constructions are susceptible to nuisance tripping. In this case, the circuit breaker reverts to an instantaneous trip characteristic because the flux is high enough to trip the breaker without any movement of the delay tube core.

In the present invention, the armature is more remote from the coil so that this type of nuisance tripping is greatly reduced. With the more remote coil, the instantaneous trip region for overcurrents of a duration associated with motor start-up is not reached until about 10 to 12 times rated current. This results in improved motor starting characteristics in the 6 times region since it requires delay core movement for tripping at higher percentage overloads.

A second type of short duration, high current surge commonly referred to as a pulse, is encountered in circuits containing transformers, capacitors and tungsten lamp loads. These surges exceed the steady state current by ten to thirty times, and usually last for between two to eight milliseconds. Surges of this type will cause nuisance tripping in conventional delay tube type electro-magnetic circuit breakers.

Various attempts have been made to deal with these very short term, high magnitude in-rush currents. These include the provision of a so-called shorted turn adjacent the electro-magnet coil as shown, for example, in U.S. Pat. No. 3,517,357, and the connection of the armature to an inertia wheel as shown in assignee's U.S. Pat. No. 3,497,838. While both of these arrangements have evidenced very satisfactory operation for the lower magnitude and shorter surge pulses, difficulties have been encountered with these devices in preventing nuisance tripping for the longer lasting and particularly the higher magnitude pulses, that is, those approaching thirty times rated current. In addition, devices of this type have not evidenced tolerance to pulses of even higher magnitude which occur in modern electrical equipment such as computers, digital circuits and the like where short term pulse current values may be as high as fifty times rated current.

The present invention is directed to an improved circuit breaker construction which overcomes these and other problems and particularly to a simplified electro-magnetic circuit breaker having an improved delay construction which evidences a pulse tolerance so as to avoid nuisance tripping in the presence of short term currents which may exceed steady state values by as much as 5,000 percent. In the present invention, the circuit breaker comprises a coil, delay tube, armature and frame which are arranged such that a non-magnetic, non-conductive space is provided between the pole piece and the end of the coil. The core or slug of the delay tube is modified to be of such length and shape that the distance from the center of the mass of the core to the end toward the pole piece is greater than the distance of the electrical center of the coil to the pole piece. It has been found that in this type of construction, the non-magnetic, non-conductive space between the top of the coil and the pole piece is directly related to the instantaneous trip point of the breaker. That is, the greater this space within predetermined limits, the higher an instantaneous current can be tolerated by the circuit breaker. Such a construction evidences improved pulse tolerance over any known arrangement and when combined with an inertial delay, gives circuit breaker tolerance to pulses as high as 50 times rated current.

The non-magnetic, non-conductive space between the top of the coil and the pole piece also increases the tolerance of the circuit breaker to long term overcurrents of up to as much as approximately 10 seconds.

It is therefore one object of the present invention to provide an improved electro-magnetic circuit breaker.

Another object of the present invention is to provide a circuit breaker having improved pulse tolerance to minimize nuisance tripping.

Another object of the present invention is to provide a circuit breaker having increased trip time for high short term overcurrents without substantial modification of the conventional small overload trip time response.

Another object of the present invention is to provide a circuit breaker which increases pulse tolerance two to three-fold over present standard circuit breaker constructions.

Another object of the present invention is to provide an electro-magnetic circuit breaker having a trip time curve more closely conforming to the curves for thermal breakers for wiring protection.

Another object of the present invention is to provide an electro-magnetic circuit breaker which allows for motor start applications with closer protection on prolonged low-value overloads.

Another object of the present invention is to provide a simplified delay construction for an electro-magnetic circuit breaker.

Another object of the present invention is to provide an improved circuit breaker delay construction in combination with an inertial delay mechanism.

Another object of the present invention is to provide a circuit breaker having improved tolerance to long term overcurrents of up to as much as approximately 10 seconds.

Another object of this invention is to provide an improved circuit breaker delay for protecting induction motors.

These and further objects and advantages of the invention will be more apparent upon reference to the following specification, claims and appended drawings wherein:

FIG. 1 is a cross section through an electro-magnetic circuit breaker constructed in accordance with the present invention;

FIG. 2 is a cross-sectional view similar to FIG. 1 showing the principal delay components of the circuit breaker of FIG. 1;

FIG. 6 shows a motor protection circuit for the circuit breaker of FIGS. 1 and 4.

Figure 3:
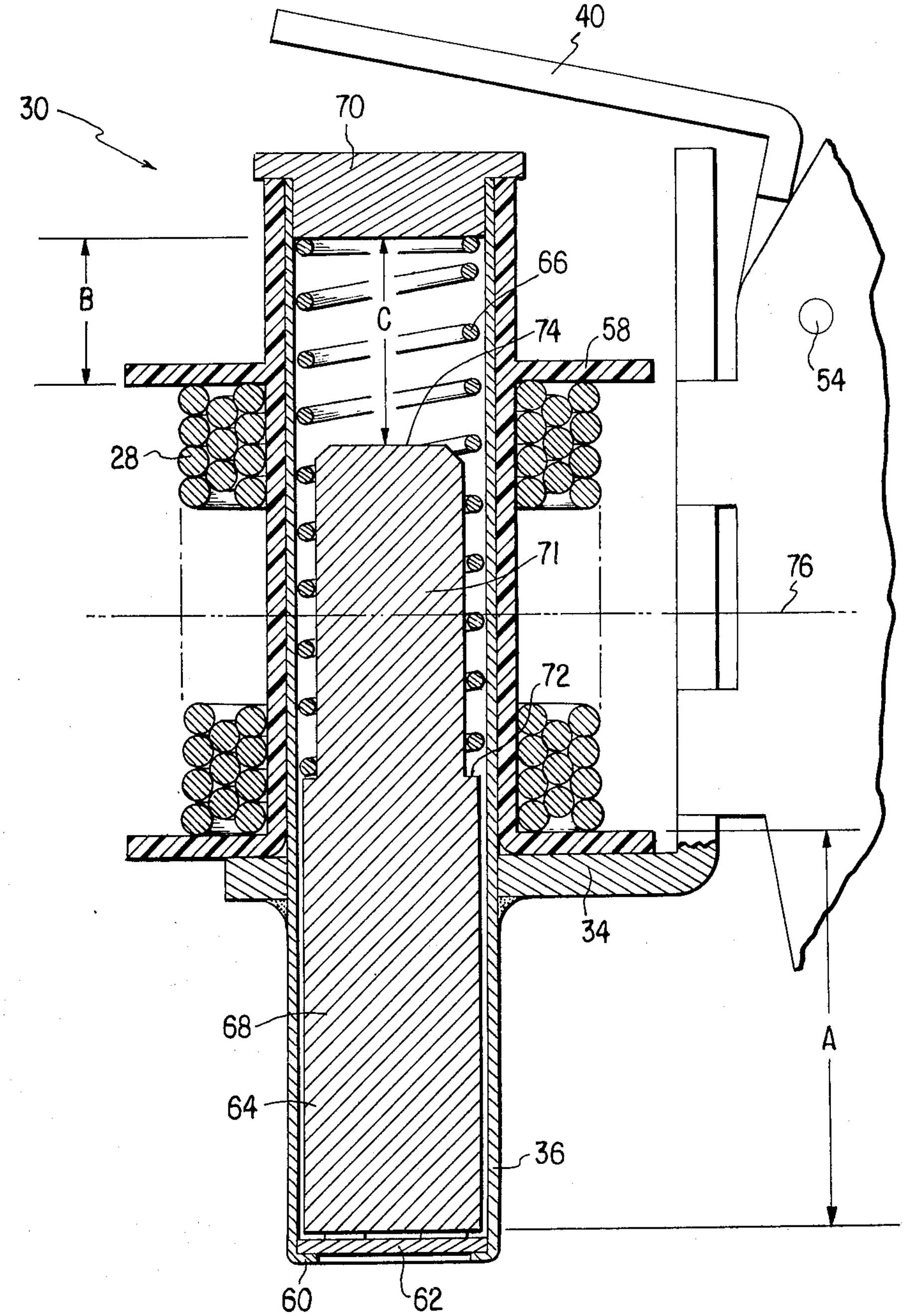
FIG. 3 is an enlarged cross section through the delay tube forming a part of the circuit breaker of FIGS. 1 and 2.

Referring to the drawings, the novel circuit breaker of the present invention is generally indicated at 10 in FIG. 1. It comprises a plastic case 12, one-half of which has been omitted in FIG. 1 to show the internal operating mechanism of the breaker. This comprises a handle 14 which operates a toggle mechanism generally indicated at 16 to which is connected a movable contact 18. This contact is adapted to move into and out of engagement with a stationary contact 20 electrically coupled to a first terminal 22.

A second terminal 24 of the circuit breaker is electrically connected to one end 26 of a coil 28 forming a part of an electro-magnet generally indicated at 30. The other end of the coil is connected by a flexible lead 32 to a conductive bar 33 carrying the movable contact 18.

Coil 28 is mounted on a frame 34 and surrounds a delay tube 36 terminating at one end in a pole piece 38. Spaced from the pole piece and adapted to be attracted to it is one end of an armature 40. This armature, when it is attracted, actuates a sear 42 which engages and trips the links of the toggle 16 causing movable contact 18 to move away from stationary contact 20 under the influence of a toggle spring. By way of example only, the mechanism of toggle 16 may be of the type more fully shown and described in assignee's U.S. Pat. No. 3,497,838. Finally, coupled to the armature 40 is an inertial wheel 44 for imparting an inertial delay to the trip time of the circuit breaker.

FIG. 2 is a simplified diagram with like parts bearing like reference numerals, showing the principal elements of the circuit breaker contributing to the pulse tolerance exhibited by the circuit breaker of this invention. In FIG. 2, the inertial wheel 44 is shown as rotatable about a shaft 46 and carried near its outer edge is a crank pin 48 slidably retained in a slot 50 provided in the lower end 52 of the armature 40. Rotation of the armature 40 about a pivot 54 causes the inertial wheel 44 to rotate about shaft 46 by means of the sliding engagement of the pin 48 in slot 50. The circuit breaker is shown in the open position in FIG. 1 with contacts 18 and 20 separated whereas in FIG. 2 the handle has been moved to the closed position with the circuit completed through the now engaging contacts 18 and 20.

FIG. 3 is an enlarged cross section through the electro-magnet 30 showing the improved delay mechanism of the present invention in relationship to the pivoted armature 40. Secured to delay tube 36 and supporting it is the frame 34 which also carries a bobbin 58 about which the coil 28 is wound. Delay tube 36 is turned over at one end as indicated at 60 and sealed by an end piece 62. Delay tube 36 may have an alternate construction utilizing a one piece drawn shell. In this case, end piece 62 is not required. The other end of delay tube 36 is closed off and sealed by the magnetic pole piece 38. The interior of the delay tube is conventionally filled with a viscous fluid such as oil, but the oil has been omitted in FIG. 3 for the sake of clarity.

Within the delay tube 36 is a magnetic delay core or slug 64 which is biased against end piece 62 by a helical compression spring 66 having its uppermost end bearing against the pole piece 38. Core 64 has an enlarged lower end 68 and a reduced diameter upper end 71 around which a portion of spring 66 passes and defining an annular shoulder 72 against which the lower end of spring 66 bears. When a prolonged overcurrent passes through coil 28, delay core 64 moves upwardly against the action of the viscous oil to compress spring 66 until the upper end of delay core 68 engages pole piece 38, causing an increased magnetic flux in the gap 70 between the pole piece and armature 40 so that the armature is attracted to the pole piece and rotates about its pivot 54 to collapse the toggle mechanism 16 of FIG. 1, separating contacts 18 and 20 and opening the circuit in response to the overcurrent.

In conventional circuit breaker delay tubes, the distance from the bottom of the core 64 to the plane containing the bottom of the coil 28, as indicated by the dimension A in FIG. 3, is customarily chosen to be about one-third of the overall interior distance of the delay tube, namely from the bottom of the core to the underside of the pole piece 34. Customarily, the coil 28 surrounds the upper two-thirds of the delay tube. This conventional construction optimizes the delay function of the tube while, at the same time, maintaining the overall length of the tube within reasonable bounds. It is an important feature of the present invention that the conventional construction is modified so that the coil 28 does not extend around the upper two-thirds of the delay tube but is instead spaced from the plane containing the undersurface of the pole piece 38 by a distance indicated by the dimension B in FIG. 3 which is the distance from the plane containing the under surface of the pole piece 38 to the plane containing the top surface of the coil 28. While any non-electrically conductive and non-magnetic material may occupy this space normally taken up by the coil, in the preferred embodiment it is simply left open so that there is an air space or gap between the top of the coil and the pole piece.

It is a further feature of this construction that the upper end 74 of the delay core extends substantially above the plane containing the electrical centerline of coil 28 as indicated by the dashed line 76. This is to be contrasted from conventional constructions in which the upper end of the delay core, when in the fully retracted position, as illustrated in FIG. 3, is either approximately at or usually slightly below the electrical centerline of the coil. Not only does the delay core 64 extend above the centerline, but the core is in fact made longer in length than in conventional constructions having the same overall length of delay tube so that the distance C in FIG. 3 between the undersurface of the pole piece 38 and the top surface 74 of the delay core is actually reduced. The reduction in the dimension C which corresponds to the increase in overall length of the delay core 64 is approximately one-half the dimension B. That is, the delay core is lengthened by approximately one-half the distance that the coil 28 is spaced from the pole piece. In constructions in which the overall length of the delay tube remains the same, the spacing B can vary in length from about one-fifteenth to about one-sixth the overall interior length of the delay tube. This means that the distance C may be from approximately one-sixth to approximately four-fifteenths the length of the delay tube. Of course, if space permits a longer delay tube, the spacing B may be increased to as much as half the distance from the bottom of the coil to the underside of the pole piece 38. However, in all instances, in contrast with prior constructions, the tip 74 of the delay tube core extends substantially above the centerline of the coil when the spring 66 is fully expanded and the other end of the core engages the lower end of the delay tube.

It is an unexpected result of the arrangement illustrated in FIG. 3 that the advantages obtained in spacing the coil from the pole piece by the dimension B far more than offset the disadvantage accompanying reduction in distance C between the end of the core and the pole piece. That is, with a longer core and a smaller spacing between the end of the core and the pole piece, one might expect the pulse tolerance to be reduced or at least any advantage obtained by spacing the coil away from the pole piece offset by the increased amount of magnetic material within the coil and more closely adjacent the pole piece. However, it has been found that the pulse tolerance for very short term and very high value currents is inversely proportional to the force on the armature. This force may be represented by the equation $F - S(uNI/laC)^2$ where:

$F$ = force on the armature $N$ = number of turns in the coil $I$ = current through the coil $S$ = mean cross sectional area of the air gap of the magnetic circuit $u$ = permeability or amplification factor due to the iron core presence in the coil $C$ = leakage factor $la$ = length of the air gap of the magnetic circuit under initial or static conditions.

As can be seen from the above equation, as the coil is shortened, the leakage factor $C$ and the air gap length $la$ increase. However, at the same time, the core has to be lengthened for proper electrical operation. This increases the $u$ factor. However, the reduction in force resulting from the increase in leakage factor and air gap far outweighs the increase in force due to the increased factor. There is, of course, an optimum point of balance between the two and in the preferred embodiment, the spacing B is approximately 2/15ths the interior length of the delay tube.

It has been found that for a shorter coil having the same number of turns and same current (dimension A remains the same), by far the largest factor affecting the force on the armature is the substantial increase in the leakage factor C. With the end of the coil spaced from the pole piece, the flux focusing effect of the pole piece is greatly reduced and there is much less force on the armature. Much of the leakage flux returns through the magnetic frame 34 and never reaches the armature. However, once the core has been pulled up by longer term overcurrents to engage the pole piece, the core surrounded by the coil is in direct magnetic metal contact with the pole piece and there is little leakage flux so that the attraction force on the armature is approximately the same as in previous constructions. That is, increased pulse tolerance is obtained without any significant degradation in tripping characteristics of the circuit breaker to overcurrents longer than approximately eight milliseconds (one-half cycle at 60 Hz.).

Using conventional standard constructions, actual tests have shown that the pulse tolerance is about eleven, that is, nuisance tripping will occur when the overcurrent magnitude exceeds about eleven times rated current during one-half cycle of operation, i.e., for a period of approximately eight milliseconds. If a standard construction is combined with an inertial wheel of the type shown in assignee's U.S. Pat. No. 3,497,838, this pulse tolerance can be increased to a value of about 21, that is, nuisance tripping will occur only when the overcurrent reaches a value over one-half cycle (60 Hz.) of twenty-one times rated current.

To illustrate the substantial advantage afforded by the present invention, tests indicate that the construction illustrated in FIG. 3 of the present invention, with a preferred air space of two-fifteenths of the overall interior length of a standard length delay tube, will avoid nuisance tripping until the overcurrent exceeds twenty-five times rated current. The construction illustrated in FIGS. 1 and 2 in which the delay tube construction of FIG. 3 is combined with the inertial wheel 44, has been found to withstand pulses without tripping for overcurrents that are as much as fifty times rated current and one-half cycle (approximately 8 milliseconds) in duration. Thus, the device of the present invention evidences a pulse tolerance for current values of more than twice those tolerated by previously known constructions.

Figure 4:
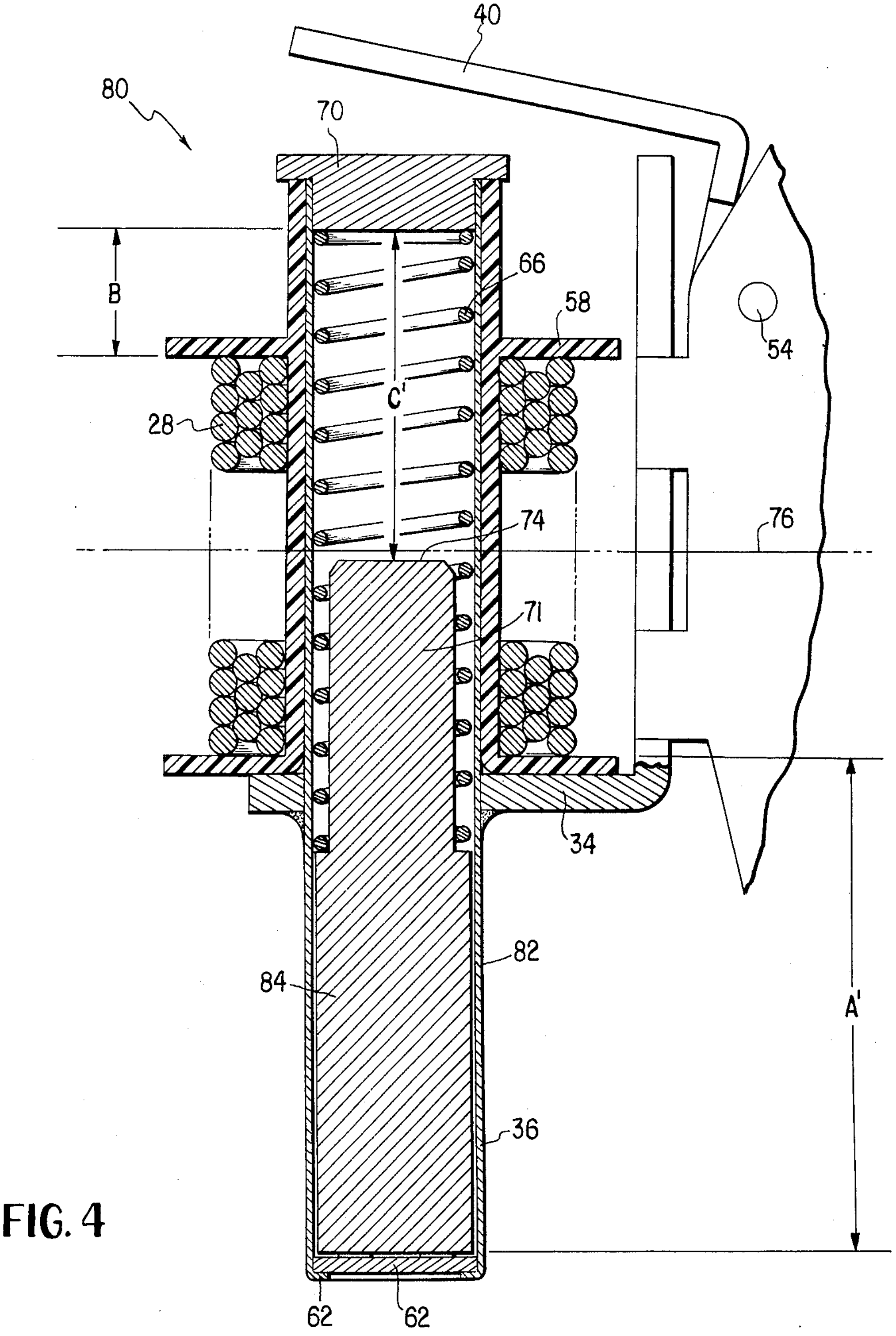
FIG. 4 is an enlarged cross section similar to FIG. 3 of a modified delay tube construction in accordance with the present invention.

FIG. 4 is a cross section through a modified delay tube assembly constructed in accordance with the present invention in which like parts bear like reference numerals. FIG. 4 is drawn to the same scale as FIG. 3 and the critical air gap 70 in FIG. 4 for the sake of comparison as given by the dimension B is the same as in FIG. 3. The overall delay tube construction generally indicated at 80 in FIG. 4 is essentially the same as in FIG. 3 with the exception that the delay tube 82 is longer having an increased dimension A' so as to increase the spacing C' between the top end of the core 84 and the underside of the plug 38. Additional slight changes in the construction of FIG. 4 include a slightly smaller diameter for both the tube 82 and core 84 making it possible to use the same compression spring 66 even with the longer tube. As can be seen in FIG. 4, the upper end of the slug or core 84 is just slightly beneath the plane containing the centerline 76 of the coil 28. However, the important difference between the embodiments of FIGS. 3 and 4 is the increase in the spacing C' between the core and the plug has been found to significantly increase the long term tolerance characteristic of the circuit breaker in conjunction with the air gap B.

Figure 5:
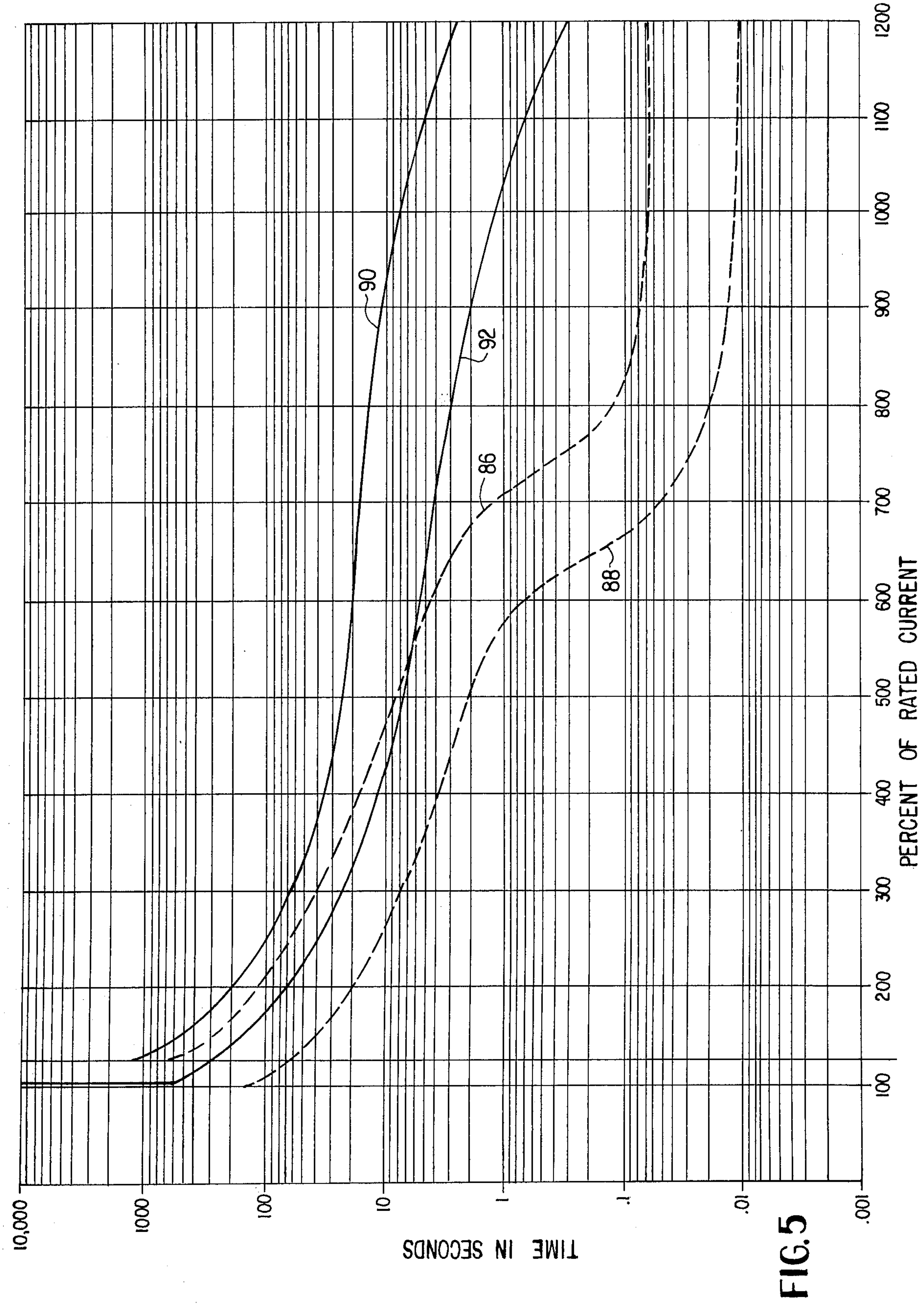
FIG. 5 is a graph of trip time as a function of percent rated current for the circuit breaker of FIG. 1 with a modified delay construction as shown in FIG. 4.

FIG. 5 is a plot of time in seconds as a function of percent of rated current for a circuit breaker constructed in accordance with FIG. 1 and employing the delay tube construction illustrated in cross section in FIG. 4. A first band of operating characteristics is defined by the curved space between the dashed lines 86 and 88 and these characteristics are typical of a conventional circuit breaker construction having no air gap B. A second set of characteristics is illustrated in FIG. 5 as defined by the curved space between the solid lines 90 and 92 showing a band of characteristics having improved tolerance to tripping, particularly for overcurrents in excess of about 500 percent of rated current and having a time of persistence of up to approximately 10 seconds. While the band between the dashed lines 86 and 88 is for a conventional construction, the band defined by the lines 90 and 92 is for the circuit breaker of the present invention having the delay construction of FIG. 4.

Figure 7:
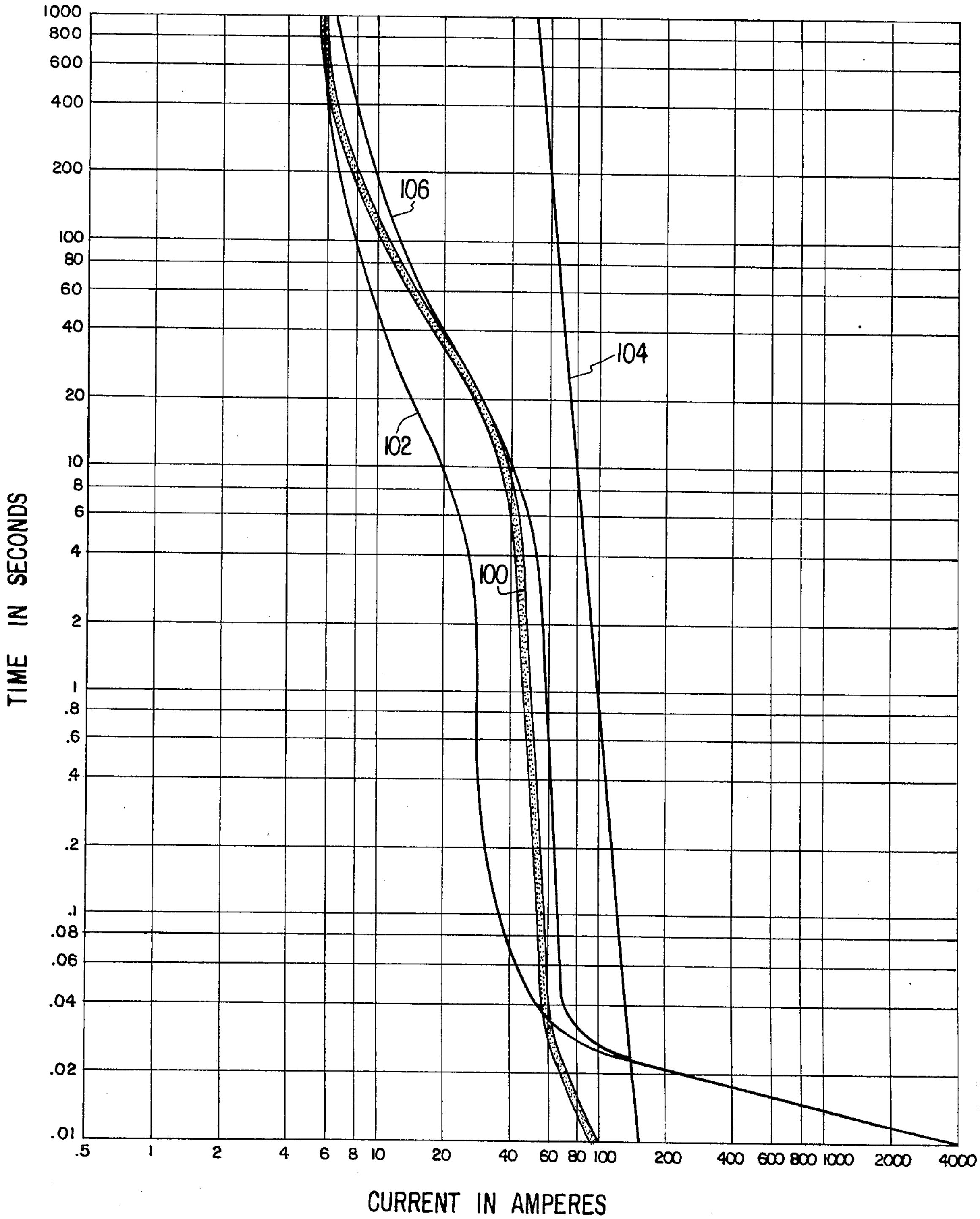
FIG. 7 is a plot of time as a function of current for the circuit breaker and fuse of FIG. 6.

FIG. 6 is a simplified circuit diagram of a motor protection circuit incorporating the circuit breaker of the present invention as illustrated in FIGS. 1 and 4. The circuit comprises a power source 90 having one side grounded as at 92 and connected to an induction motor 94 by way of a circuit breaker 96 constructed in accordance with FIGS. 1 and 4. If desired a fuse 98 may be included in the circuit to provide short circuit protection where the available short circuit current is greater than the capacity of the breaker. Usually it is not needed. FIG. 7 is a plot of time in seconds as a function of current in amperes and shows an idealized induction motor protection curve or characteristic at 100. Plotted alongside of this idealized curve is a second curve 102 which shows the characteristic of a standard delay construction having no air gap B as in the present invention. The straight line 104 is a plot for the conventional fuse 98 of FIG. 6 which, by way of example only, may be a A30 by 30 amp. fuse. Finally, curve 106 in FIG. 7 is a plot of the delay characteristic for the circuit breaker 96 of FIG. 6 constructed in accordance with FIGS. 1 and 4. As can be seen, the circuit breaker 96 results in the curve 106 of FIG. 4 which throughout its length is much closer to the idealized curve 100 and more closely approximates the idealized protection curve for overcurrents.

The plot in FIG. 7 is for two phases of a three phase motor protection system. The data is valid for 200 or 480 volts at frequencies of from 10 to 200 Hz. The desired characteristics result in tripping between 1,000 and 1,200 seconds for currents of from 5 to 5.5 amps, in 10 to 12 seconds for currents from 35 to 40 amps and in 0.12 to 0.14 seconds for currents of 1,000 amps. These are for ambient temperatures in the neighborhood of 40° C and the test points for which the curves in FIG. 7 were plotted are believed accurate to $\pm 5$ percent. It is apparent from the above that the present invention provides an improved circuit breaker and particularly an improved delay construction for a circuit breaker which significantly increases the pulse tolerance of the breaker, that is, its tolerance to pulses having durations of from approximately 2 to 8 milliseconds and having magnitudes of up to 50 times rated current. This is accomplished in a simplified and inexpensive construction and most importantly is accomplished in a configuration which does not significantly modify the trip characteristics of the circuit breaker to either conventional in-rush currents which may last on the order of approximately one second or to long term overcurrents of smaller value. That is, the improved pulse tolerance is obtained without sacrificing any of the desirable characteristics of conventional circuit breaker delay construction.

In a modified embodiment having increased spacing between the pole piece and delay core significantly improved tolerance to long term overcurrents is obtained. By increasing the core to pole piece spacing, significantly increased protection can be obtained for motors and particularly induction type motors. Circuit breakers of this type are particularly suited for protecting induction motors in which the speed is varied by varying the drive frequency of the motor. Improved short term characteristics of the circuit breaker avoid nuisance tripping during start-up while the improved long term characteristic features insure that the circuit breaker does not trip too soon, while at the same time insuring that excessive overcurrents do not burn up the motor.

The invention may be embodied in other specific forms without departing from the spirit or essential characteristics hereof. The present embodiments are therefore to be considered in all respects as illustrative and not restrictive, the scope of the invention being indicated by the appended claims rather than by the foregoing description, and all changes which come within the meaning and range of equivalency are therefore intended to be embraced therein.

What is claimed and desired to be secured by United States Letters Patent is:

1. A circuit breaker comprising a pair of electrical contacts, a handle, a collapsible toggle coupling said handle to one of said contacts, a movable armature having a portion adapted to engage and trip said toggle, a frame, a hollow delay tube carried by said frame and having a magnetic pole piece at one end, a magnetic core movable in said delay tube, a trip coil surrounding a portion of said trip tube, said coil being spaced from the plane of the near end of said pole piece by a non-conductive, non-magnetic gap having a length of from about one-fifteenth to about one-sixth the overall interior length of said delay tube, and spring means in said delay tube normally biasing said core into a position away from said pole piece, said core when in said position extending from the end of said delay tube remote from said pole piece to a point short of a plane containing the electrical center of said trip coil.

2. A circuit breaker according to claim 1 wherein said non-conductive, non-magnetic gap comprises an air gap.

3. A circuit breaker according to claim 2 wherein said armature is pivoted to said frame.

4. A circuit breaker according to claim 2 wherein said spring means comprises a helical compression spring between said pole piece and said core.

5. A circuit breaker according to claim 4 wherein said core is stepped from a larger to a smaller diameter to define a shoulder intermediate its ends, said spring engaging said shoulder.

6. A circuit breaker according to claim 1 including an inertial member coupled to said armature.

7. A circuit breaker according to claim 6 wherein said inertial member comprises an inertial wheel.

8. A circuit breaker according to claim 7 wherein said inertia wheel carries a crank pin, said armature having a slot slidably receiving said crank pin.

9. A protection circuit comprising a source of electrical power, a motor, a circuit breaker connected in series between said source and motor, said circuit breaker comprising a pair of electrical contacts, a handle, a collapsible toggle coupling said handle to one of said contacts, a movable armature having a portion adapted to engage and trip said toggle, a frame, a hollow delay tube carried by said frame and having a magnetic pole piece at one end, a magnetic core movable in said delay tube, spring means in said tube normally biasing said core away from said pole piece, and a trip coil surrounding a portion of said trip tube, said coil being spaced from the plane of the near end of said pole piece by a non-conductive, non-magnetic gap having a length of from about one-fifteenth to about one-sixth the overall interior length of said delay tube.

10. A protection circuit according to claim 9 wherein said motor comprises an induction motor.

11. A protection circuit according to claim 10 wherein said motor comprises a variable speed induction motor.

12. A protection circuit according to claim 9 wherein said core when normally biased by said spring means extends from the end of said delay tube remote from said pole piece to a point short of a plane containing the electrical center of said trip coil.

13. A protection circuit according to claim 12 including an inertial member coupled to said armature.

14. A protection circuit according to claim 13 wherein said inertial member comprises an inertia wheel.

15. A protection circuit according to claim 14 wherein said inertia wheel carries a crank pin, said armature having a slot slidably receiving said crank pin.

16. A protection circuit according to claim 12 wherein said core is spaced from said pole piece by from approximately one-sixth to approximately four-fifteenths the interior length of said delay tube.

17. A protection circuit according to claim 9 including a fuse in series with said motor and circuit breaker.

* * * * *